US006441914B1

(12) United States Patent
Barak et al.

(10) Patent No.: US 6,441,914 B1
(45) Date of Patent: Aug. 27, 2002

(54) PREDICTION AND PREVENTION OF OFFSET PRINTING PRESS PROBLEMS

(75) Inventors: Paltiel Barak, Rosh Ha' Ayin; Refael Bronstein, Kfar Saba, both of (IL)

(73) Assignee: Creoscitex Corporation Ltd., Herzlia (IL)

( * ) Notice: Subject to any disclaimer, the term of this patent is extended or adjusted under 35 U.S.C. 154(b) by 0 days.

(21) Appl. No.: 09/414,819

(22) Filed: Oct. 8, 1999

(51) Int. Cl.$^7$ ................................................ G06K 15/00
(52) U.S. Cl. ........................................ 358/1.14; 358/1.1
(58) Field of Search ........................... 358/1.1, 1.2, 1.4, 358/1.7, 1.9, 1.14, 1.18, 540, 430, 462, 463, 464; 101/211, 216, 219, 349.1, 350.1, 365, 483, 484

(56) References Cited

U.S. PATENT DOCUMENTS

| | | | |
|---|---|---|---|
| 4,150,991 A | | 4/1979 | Dillow |
| 4,223,603 A | | 9/1980 | Faddis et al. |
| 4,350,996 A | | 9/1982 | Rosenfeld |
| 4,397,236 A | | 8/1983 | Greiner et al. |
| 4,456,924 A | | 6/1984 | Rosenfeld |
| 4,520,454 A | | 5/1985 | Dufour et al. |
| 4,552,165 A | | 11/1985 | Luska |
| 4,584,940 A | | 4/1986 | Germann et al. |
| 4,621,574 A | | 11/1986 | Faddis et al. |
| 4,718,784 A | | 1/1988 | Drisko |
| 4,777,877 A | | 10/1988 | Lemaster |
| 4,853,709 A | | 8/1989 | Stein et al. |
| 4,924,301 A | | 5/1990 | Surbrook |
| 4,936,211 A | | 6/1990 | Pensavecchia et al. |
| 5,062,362 A | | 11/1991 | Kemp |
| 5,095,330 A | | 3/1992 | Nishida et al. |
| 5,128,879 A | | 7/1992 | Greve et al. |
| 5,296,935 A | | 3/1994 | Bresler |
| 6,119,594 A | * | 9/2000 | Kipphan et al. ............ 101/365 |
| 6,230,622 B1 | * | 5/2001 | Pilling ........................ 101/484 |

FOREIGN PATENT DOCUMENTS

| | | |
|---|---|---|
| DE | 3804941 | 2/1988 |
| EP | 0309196 | 3/1989 |
| EP | 0348908 | 1/1990 |
| EP | 0402079 | 12/1990 |
| EP | 0 449 407 | 10/1991 |
| GB | 2055010 | 3/1984 |
| GB | 2160055 | 12/1985 |
| GB | 2128843 | 7/1987 |
| WO | WO 89/07525 | 8/1989 |

OTHER PUBLICATIONS

Daun et al. "Specification of the CIP3 Print Production Format", International Cooperation for Integration of Prepress, Press, and Postpress http://www.cip3.org/documents/technical_info/index.hml, 1998.

* cited by examiner

*Primary Examiner*—Arthur G. Evans
(74) *Attorney, Agent, or Firm*—Eitan, Pearl, Latzer & Cohen-Zedek

(57) ABSTRACT

There is disclosed a computerized prepress system having imposition means for receiving from a digital storage means at least one digital representation of at least one page and for arranging this digital representation in accordance with a desired plate layout, to define a digital plate image and, ghosting prediction means coupled to the imposition means. These ghosting prediction means are operable to make a ghosting prediction based on data from at least one of the digital plate image and a relatively low resolution version of the data.

19 Claims, 15 Drawing Sheets

PREDICTION AND PREVENTION OF OFFSET PRINTING PRESS PROBLEMS

FIELD OF THE INVENTION

The present invention relates to printing and graphic arts generally and more particularly to an apparatus for page composition and printing and a method for prediction and elimination of image content dependent artifacts.

GLOSSARY OF TERMS

The following terms, employed herein, are intended to have the meanings specified herein below:

Color Image

The term is intended to include image-comprising gradations of a single tone, such as black and white images.

Analog Representation of a Color Image

Any representation of a color image that resembles the original color image. The representation may appear upon a printed page, a proof or any other suitable substrate.

Digital Representation of a Color Image

Any representation of a color image which is expressed in discrete symbols, such as a computer file.

Color Characteristics of a Color Image

The characteristics of the color image, defined by individual elements of a representation of a color image, which directly represent a color or a component of a color.

Spatial Characteristics of a Color Image

Characteristics defining the arrangement of and the relationship between elements of a digital representation of a color image, such as pixels, which characteristics do not directly represent a color or a component of a color, Spatial characteristics include but arc not limited to resolution and format characteristics such as pixel by pixel encoding.

Ghost

Ghost is defined as the repeat of a previously printed image, one form roll revolution later.

Ghosting Prevention Bar

Ghosting prevention bar or ink collection bar is typically a rectangular area filled with color and placed on a signature/plate to prevent ghosting.

Plate, Signature, Imposition

Plate, Signature, Imposition have the same meaning as typically associated with that of a complete offset plate pattern that includes separate page images, registration marks, color control bars, ink collection bars and water trapping prevention bars.

Printer Spread

Imposed pages that have to keep the relative orientation between them for the printed product and pertain to the same printing form/plate.

BACKGROUND OF THE INVENTION.

The production of a book or magazine involves a large number of processes. Those processes may be grouped into five general categories: prepress, plate preparation, press set-up or "make ready", press control operations and post-press operations.

In prepress, the principal processes are graphics, image and text editing and composition. In recent years, this area has undergone revolutionary changes through the application of computer technology. State of the art systems are available for graphics, image editing and composition and for the specific functions of scanning, image processing and film and plate setting, such as the systems manufactured and sold by Scitex Corporation Ltd. of Herzlia, Israel, under the trademarks EverSmart Scanner, Dolov and Lotem. Plate preparation involves a technique known as imposition or signature assembly, which refers to the arrangement of pages on a film in a Computer-to-Film system, on a plate in a Computer-to-Plate system or on a plate in a Computer-to-Press system. The present state of the art in signature assembly is the use of computerized systems such as the system sold under the name Brisqueimpose by Scitex Corporation Ltd. of Israel. If the imposition is performed to film, the film is later used for contact exposure of printing plates. In the ease where the imposition is performed to plate, the stage of contact exposure of printing plates is eliminated. Press set-up or "make-ready" takes place after preparation of the printing plate, and typically involves the steps of plate mounting ink key setting, which determines the supply of ink flow for that plate, solution or water setting, and other steps. If the imposition is performed on a plate in a Computer-to-Press system, plate mounting is not required. The ink key setting data is derived according to the image-on-plate coverage information, which is generated in the stage of computerized signature assembly. The ink key setting data may be generated by computerized systems such as the system sold under the InkPro trade name by Scitex Corporation Ltd. of Herzlie, Israel. Press set-up information, derived by the prepress systems, is typically communicated to the press using a standard Print Production Format communication protocol called CIP3, which is described at the Internet site http;//www.cip3.org/documents/technical__info/index.html. The ink key setting data generated by these computerized systems does not take into account, however, the wet ink trapping and accordingly does not provide correct ink key settings pen color.

U.S. Pat. No. 5,875,288 to Bronstein et al. discloses an integrated computerized system for use in color printing, having at least one digital representation of a color characteristic of at least one page to be printed and a digital storage memory for storing that digital representation. An imposition apparatus is connected to the storage memory, to receive the digital representation and arrange the digital representation in accordance with a desired plate layout, thereby to define a plate image. A press setup device extracts from the plate image the color characteristic and provides ink flow set-up data to a printing press in accordance with the extracted color characteristic.

A state of the art printing press is described in U.S. Pat. No. 4,936,211 to Pensavecchia et al. The patent discloses a printing apparatus which is intended to achieve complete computer control over the entire printing process, including plate generation, ink regulation and the start-up, print, hold, shut-down and clean up stages of the actual printing operation. Pensavecchia et al. also refer to a press including a workstation, which allows an operator to input a digital representation of an original picture to be printed. The workstation may include a CRT display and internal memory for storing image data, so that the impression to be printed may he previewed before panting. A keyboard is supplied, through which the operator may key-in instructions regarding the particular press run, such as the number of copies to be printed or the number of colors in the printed copies. The workstation is also intended to allow complete control over the operating modes of the press, including printing plate imaging, press startup procedure, ink flow regulation, dampening, print, pause, shutdown and clean-up sequences.

Despite the existence of sophisticated computerized prepress systems and printing presses, the press operator is often required to intervene in the printing process to maintain the target print quality. The deviations from the desired target print quality can be significantly reduced by taking into account the characteristics of the image to be printed. Typical examples of printing defects are ghosting, improper ink transfer, wet ink trapping, solution or water balance end others. These printing defects are typically discovered only during the printing process and in extreme cases may require complete press stop, re-imposition of the signature and the production of new plates, resulting in a significant loss of time and money.

Numerous efforts have been made to eliminate these image-dependent problems, in particular mechanical ghosting, which is the occurrence of unwanted patterns of higher or lower density created by the job layout, combined with the press's inking ability. Mechanical ghosts can be seen in heavy solids or in heavy process work on both single and multicolor presses.

There are two types of mechanical ghosts, sometimes referred to as 'positive' and 'negative'. In 'negative' ghosts, illustrated in FIG. 1A, spot 20 of a slightly lighter tone (a ghost) will appear in a flat solid 22. It takes on the form of another solid 24 on the plate 26. 250–300 mm (10–12 inches) ahead of the ghost. The actual distance depends on the particular press construction. 'Positive' ghosts, illustrated in FIG. 1B, occur when a large solid 28 has a large reverse (non-printed area) 30 within its boundaries. The leftover ink, as the form rollers pass over the reverse 30, is deposited further on, resulting in a darker ghost pattern 32.

The ghosting phenomenon disturbs not only the offset printing process. Letterpress printers also suffer from this problem, but to a lesser degree. Numerous attempts have been made to reduce mechanical ghosting.

U.S. Pat. Nos. 4,223,603 and 4,621,574 both to Faddis et al., U.S. Pat. No. 4,397,236 to Greiner, U.S. Pat. No. 4,777,877 to Lemaster. U.S. Pat. No. 4,584,940 to Germann, et al. and U.S. Pat. No. 5,062,362 to Kemp disclose different improvements to the offset-press inking unit. The improvements introduced affect the ways the ink roller train is driven. The roller train typically consists of a large number of rollers, which are required to smoothen the ink film. The improvements also affect the amplitude and, frequency of the oscillating rollers or the number of form rollers.

The numerous methods described above are all mechanical solution, adding cost and complexity to the printing press, and requiring a high degree of calibration. These methods, embodied in the physical construction of the press, are applied to each print, regardless of the probability of a ghost appearing thereon.

Water plays a part in this process too. It is used in the process to separate the regions of image area from non-image area. It is known that when a plate is well desensitized and water kept to a minimum, there is less ghosting. Water, however, may be trapped on image free plate areas and if not properly evacuated cause ink emulsification, blind spots on the print and overall degradation of the printed image quality. FIG. 2 is an illustration of a plate imposition pattern with a significant image tree area of the plate or with a significant area of plate filled with text only. In order to collect excessive ink from these low ink-consumption areas and reduce ink oxidation, solid ink take-off bars 36 are typically placed by the printer close to this area on the plate. Solid ink take-off bars 36, however, make this area prone to water-on-plate trapping since they 'block' the water outlet.

Defining the amount of water required to print a particular image is more complicated than that of the amount of ink. Part of the water evaporates in the delivery train and part is evaporated from the paper before the actual printing occurs.

Sophisticated color offset presses have a water presetting system similar to the one used for ink setting, although there are no computerized programs available to preset the water or solution amount on the press.

Water balance for metallic and solid colors is essentially different from that usually selected for process color printing. These typically high ink-coverage areas have a higher water film thickness on the fountain roller than lower density process color prints.

Press operators have worked out a set of rules of thumb (basic-known in the trade rules or principles) to cope with the above problems. These include signature layouts that have an appropriate distribution of solids, halftones and type that may positively affect ghosting. When possible, they place solid areas near the gripper edge 34 to even out the plate's ink demand.

A slight rotation (angling) of the plate or a 180° rotation of the plate is sometimes used, when a high likelihood of ghosting exists. This method comprises the actual rotation of the offset plate after it is mounted on the press and first printing impressions have been produced. Sometimes, additional ink take-off bars are placed un the form to help get rid of excess ink. All of these methods are applied after a problem has been discovered during printing, are time consuming, and require a very high degree of accuracy and press operator skills.

FIG. 3A is an illustration of a plate imposition pattern 190, which is prone to mechanical ghosting. The plate 190 consists of 8 imposed pages 192, a control strip 194 and an optional ghosting prevention bar 196. The ghosting pattern produced by such a plate is typically discovered by a press operator after a number of impressions have been made. One of the well-known remedies for this problem is manual angling of the plate on the press, in a small angle Alpha of typically 1 to 1.5 degrees. The screening angles at the CMYK separations (also called 'screen quartet') are generally selected in such a way that they form the recommended minimum-moiré pattern by arranging the angles in 15, /5, 0 and 45 degrees, respectively, relative to one of the paper edges. A screen structure 198 and the 0-degrees angle created by the yellow separation are shown in an exaggerated form on FIG. 3A. Some staircase visual effects may appear on the edges of the image if the orientation of the 'screen quartet' with respect to the paper edge is not maintained.

FIG. 3B is an illustration of the offset plate 190 of FIG. 3A, manually angled on the press. When the plate is manually angled on the press, in an angle Alpha, the screen orientation with respect to the paper edge is kept constant. The paper is then cut according to the folding/cutting marks orientation, typically (except in packaging) parallel to the imaged page edges. This manual angling maintains the relative orientation of the 'screen quartet' with respect to the paper edge and avoids appearance of staircase effects on the edges of the image.

FIG. 3C is an illustration of a prior art electronically angled image of the offset plate 190, with an imposition pattern prone to mechanical ghosting. In this case, the plate 190 does not change its orientation on the press, but rather, each page 192 is rotated in a small, typically 1 to 1.5 degrees angle Alpha. The screening angles of the CMYK separations remain, however, oriented with respect to the imaging device axis. Once again, the screen structure 198 and the angle Alpha created by the yellow separation are shown in an exaggerated form in FIG. 3C. Some staircase visual effects will inevitably appear on the edges of the image, if the relative orientation of the 'screen quartet' with respect to the paper edge is not maintained. The rotation of the separate pages 192 also changes the alignment of the printer spread (marked in broken lines), creating a difference 200 between their respective bottom/top boundaries positions. If the control strip 194 is not rotated and its dimensions are not adjusted, it will not cover the whole printing image area, leaving gaps 202 at both ends of the control strip 194.

FIG. 3D is an illustration of the plate 190 of FIG. 3C, with control strip 194 electronically rotated, according to the prior art. Rotation of such a long, typically 1-meter (40-inch) strip, even in a small one-degree angle, displaces the end of the strip a relatively large distance 204 of more than 17 mm. Such a large displacement may not leave enough space for inserting ghosting prevention bars and thus complicates mechanical ghosting prevention.

There are a number of disadvantages with state of the art imposition systems such as Brisqueimpose or Preps Pro, which is commercially available from ScenicSoft, Inc. of Everett, Wash. U.S.A. These systems disregard ghosting considerations, as well as other quality related parameters such as minimal dot size and screen structure, their compatibility to the paper grade, coating, surface roughness, and fountain solution of the particular printing press. These also affect the quality of the printed image.

SUMMARY OF THE INVENTION

The present invention is directed to a prepress and press system including the means and methods for predicting press related problems and preventing them digitally.

According to a first aspect of the present invention, a computerized prepress and press system is presented, the system including imposition means and ghosting prediction means. The imposition means receive from a digital storage means at least one digital representation of at least one page and arrange the at least one digital representation in accordance with a desired plate layout, thereby defining a digital plate image. The ghosting prediction means are coupled to the imposition means and are operable to predict, based on one of the digital plate image data and a relatively low resolution version of the digital plate image data, where ghosting will occur on the printed image.

According to another aspect of the present invention, there is also presented ghosting prevention means coupled to the ghosting prediction means and to the imposition means. The ghosting prevention means are operable to calculate positions and color values for ghosting prevention bars, using the ghosting prediction.

According to yet another aspect of the present invention, there is also presented means for automatically inserting ghosting prevention bars into the digital plate image.

According to another aspect of the present invention, there is also presented water trapping prediction means coupled to the ghosting prediction means and to the imposition means. The water trapping prediction means are operable to predict, based on the digital plate image data, where water-trapping will occur on the plate.

According to yet another aspect of the present invention, there is also presented water trapping compensation means, coupled to the water trapping prediction means, operable to calculate positions and sizes for water-trapping prevention bars, using the water trapping prediction.

According to yet another aspect of the present invention, there is also presented ink trap correction means coupled to the imposition means, operable to correct zonal ink key setting for wet ink trapping.

According to yet another aspect of the present invention, there is also presented means for transferring said corrected zonal ink key setting to a press set-up means of the press.

According to yet another aspect of the present invention, there is also presented means for calculating automatic water setting.

According to yet another aspect of the present invention, the means for calculating automatic water setting include means for calculating automatic water acting for spot colors.

According to yet another aspect of the present invention, the means for calculating automatic water setting include means for calculating automatic water setting for metal colors.

According to yet another aspect of the present invention, there is also presented means for transferring the automatic water setting to a press set-up means of the press.

In another aspect, the present invention presents a method for creating a digital image of a printing plate, including the step of creating a first digital image of the printing plate, using digital representation of at least one page and given coordinates thereof on the printing plate. The method also includes the stop of using one of the first digital image of the printing plate and a relatively low resolution version of the first digital image of the printing plate to predict where ghosting will occur on the printed image. The method also includes the step of using the first digital image of the printing plate and the ghosting prediction to create a second digital image of the printing plate, the second digital image including a ghosting prevention bar.

In yet another aspect of the present invention, the ghosting prevention includes the step of inserting the ghosting prevention bar into the first digital image.

In yet another aspect of the present invention, the ghosting prevention bar is divided into segments.

In yet another aspect of the present invention, the ghosting prevention includes the step of rotating the at least one page of the first digital image by a rotation angle and rotating the screen pattern of the at least one page by the same rotation angle.

In yet another aspect of the present invention, the ghosting prevention includes the step of rotating at least one printer-spread of the first digital image and rotating the screen pattern of the at least one printer-spread by the same rotation angle.

In yet another aspect, the method for creating a digital image of a printing plate additionally includes the step of dividing the color control bar of the digital image into segments.

In yet another aspect the method for creating a digital image of a printing plate additionally includes the steps of using a digital image of the printing plate to predict where water trapping will occur on the printing plate, and using the digital image of the printing plate and the prediction of water trapping to create a new digital image of the printing plate, the new digital image including digital water take-off bars.

BRIEF DESCRIPTION OF THE DRAWINGS

The present invention will be understood and appreciated more fully from the following detailed description taken in conjunction with the appended drawings, wherein like reference numerals or characters indicate corresponding or like components or steps, in which.

DETAILED DESCRIPTION OF THE PRESENT INVENTION

Figure 4:
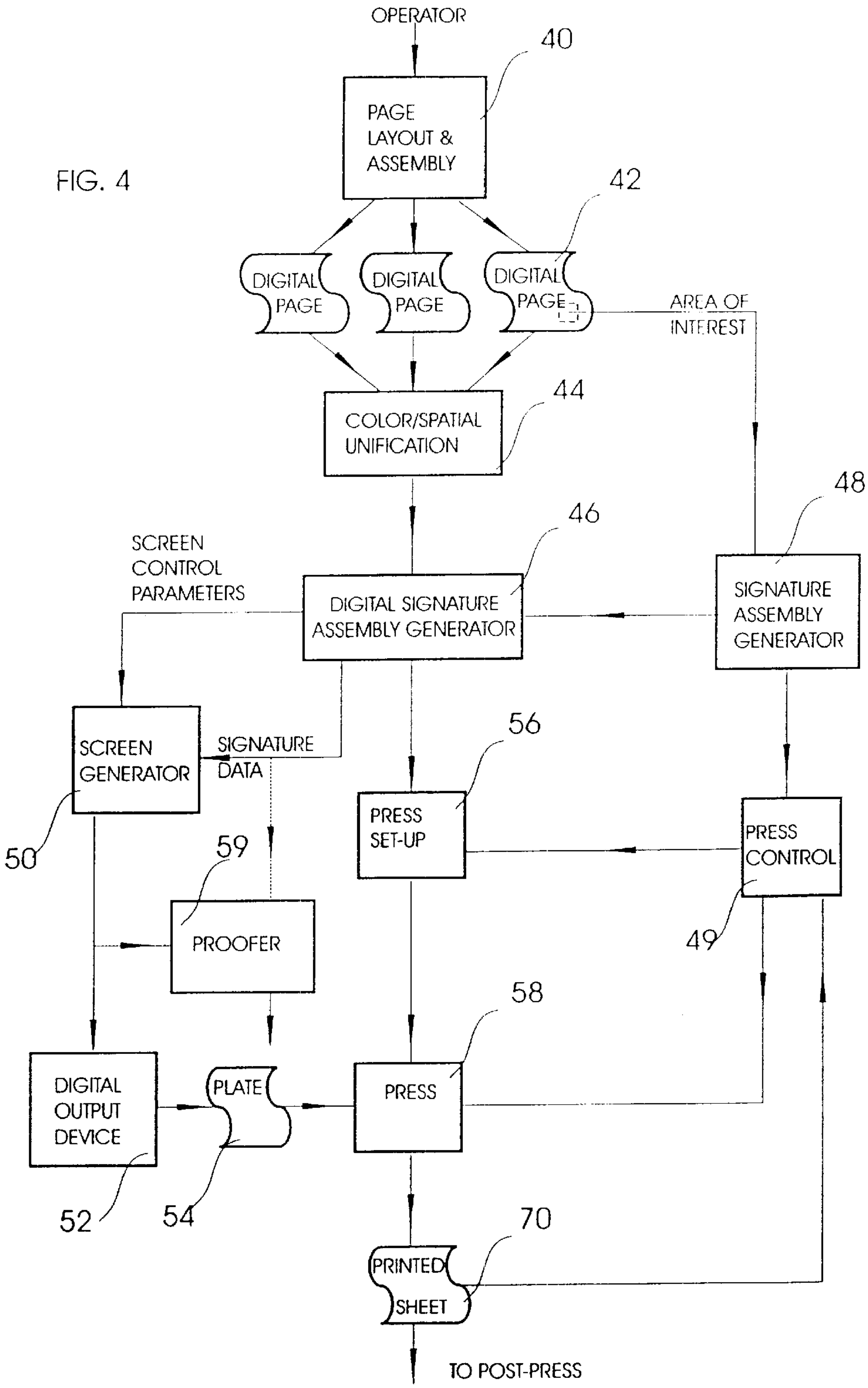
FIG. 4 is a simplified block diagram illustration of a prior-art integrated computerized system for use in printing.

Reference is made to FIG. 4, which illustrates an integrated computerized system for use in printing. The system is described below, with additional details of the system and components thereof in U.S. patent application Ser. No. 07/650,249 (now U.S. Pat. No. 5,875,288 to Bronstein et al.). The system includes apparatus 40 for providing a plurality of single page digital representations 42. Apparatus 40 typically comprises at least one conventional computerized page layout and assembly system such as an Apple G-3 workstation or a Power PC workstation, with software applications such as illustrator or PageMaker and PhotoShop, all commercially available from Adobe Systems incorporated of California, USA, or QuarkXpress, commercially available from Quark Inc. of Denver, Colo., USA. These may be employed in conjunction with an interpreter device such as Brisque, commercially available from Scitex Corporation of Herzlia, Israel. One or more such computerized page layout systems may be provided, or linked to the system of the present invention, by any suitable data communication technique or means and may be remotely located from the rest of the system. Alternatively, the single-page digital representations may be supplied by a large storage device such as a server disk.

Color and spatial unification apparatus 44 receives the plurality of single-page digital representations 42 from apparatus 40, each of which may have different spatial and color characteristics. Color and spatial unification apparatus 44 unifies the spatial and color characteristics of the single-page digital representations 42 and outputs data for each of the single pages, which preferably comprises pixel-interleaved data. Preferably, the single-page data is stored in intermediate storage (not shown) and is subsequently provided to digital signature assembly generator 46 as explained in U.S. patent application Ser. No. 07/650,219 (now U.S. Pat. No. 5,875,288). The term "pixel-interleaved Data" is defined in U.S. Pat. No. 5,296,935 to Bresler, which is incorporated herein by reference.

Color and spatial unification apparatus 44 may comprise a Trans/4 apparatus, commercially available from Scitex Corporation, or alternatively may comprise the color and spatial transform apparatus described in U.S. Pat. No. 5,298,935. The unified page data provided by color/spatial unification apparatus 44 is provided to a digital signature assembly generator 40 such as BrisqueImposition, commercially available from Scitex.

Signature assembly generator 48 Is operative to provide a list at tiles to be imposed, preferably including, for each color image file and for each signature marking file, information regarding desired positioning thereof on the signature. The information regarding the desired positioning preferably takes into consideration characteristics of the post press equipment such as folding, cutting and binding equipment. Therefore, signature assembly generator 48 preferably stores information regarding the post-press equipment. The list of flies to be imposed is provided to digital signature assembly generator 46.

Digital signature assembly generator 46 is operative to provide a preliminary digital representation of the signature, by carrying out a full computerized page imposition function on the unified page data, including provision of signature markings such as registration marks, folding marks, cutting marks, control strips, as will be described in detail herein below, preferably resulting in a complete digital representation of the full signature.

Figure 5:
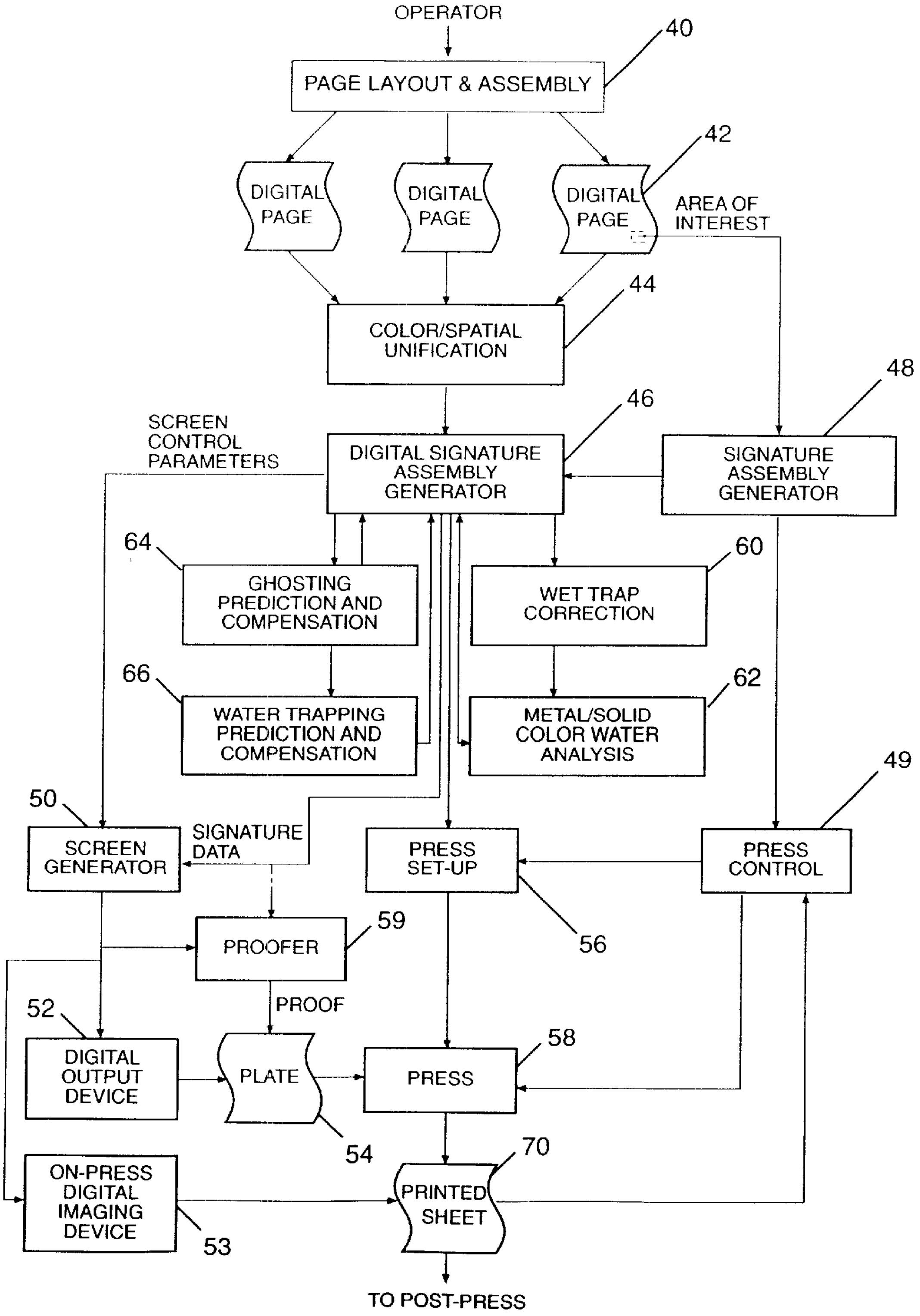
FIG. 5 is a flowchart of a preferred embodiment of an algorithm useful in implementing in an integrated computerized system for use in printing, constructed and operative in accordance with a preferred embodiment of the present invention.

Reference is now made to FIG. 5, which illustrates an integrated computerized system for use in color printing, constructed and operative in accordance with a preferred embodiment of the present invention. The system is similar to that described herein and shown in FIG. 4, with identical components already described and additional and/or changed components noted below.

A preliminary digital representation of the signature is provided to a mechanical ghosting prediction and compensation unit 64. The mechanical ghosting prediction and compensation unit 64 analyses the imposition pattern and determines whether the signature is prone to mechanical ghosting. If the examined signature is prone to mechanical ghosting, compensation patterns are automatically introduced into the signature. The mechanical ghosting prevention patterns may present ink take-off/collection bars, change of screen patterns, complete signature angular rotation or, in extreme cases, creation of modified signatures.

Figure 1A:
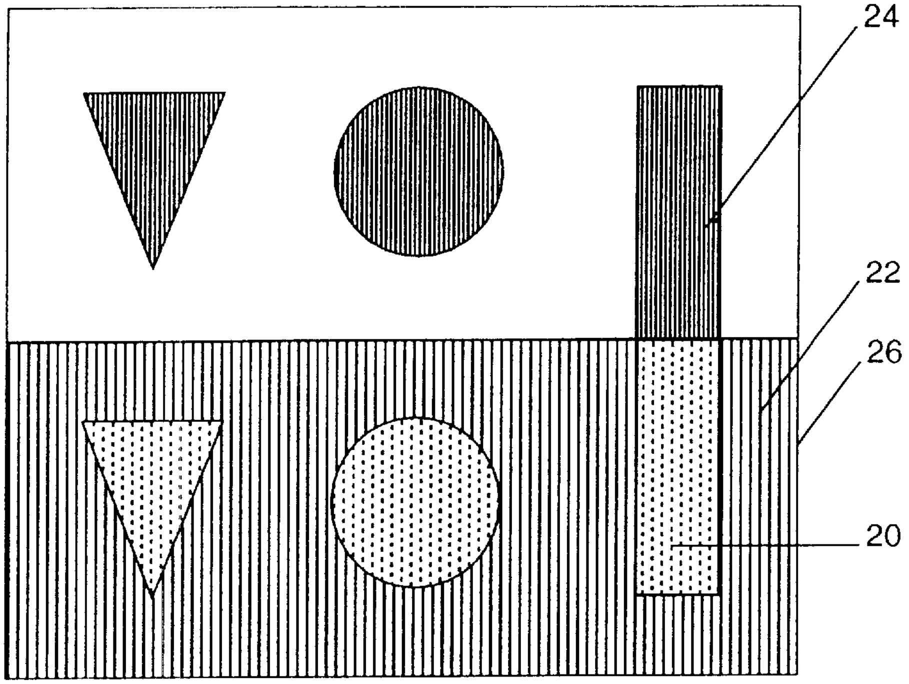
FIG.1A (Prior Art)
FIG. 1A is a schematic illustration of a negative mechanical ghosting.
Figure 1B:
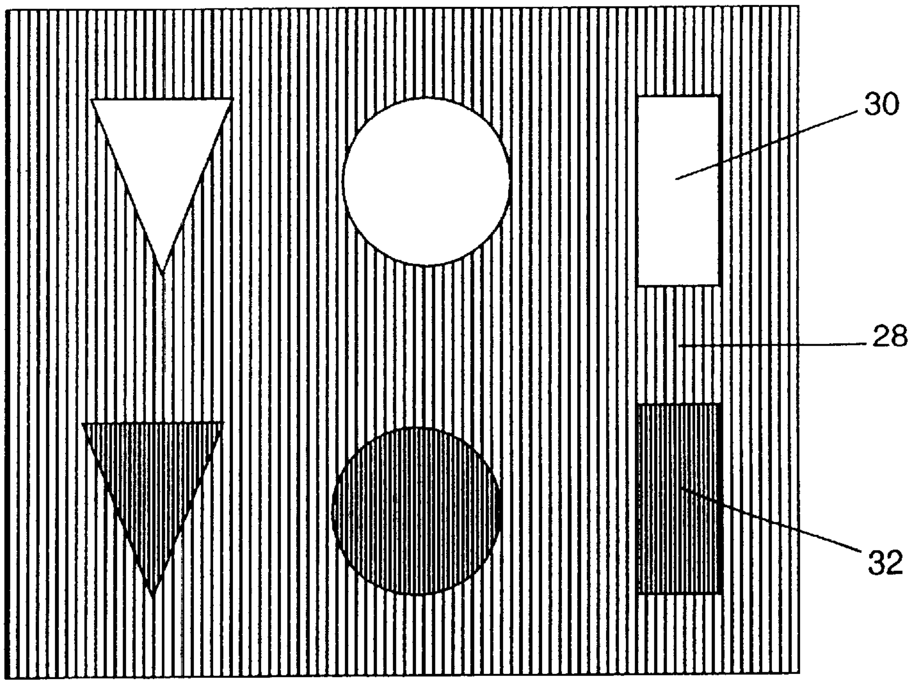
FIG.1B (Prior Art)
FIG. 1B is a schematic illustration of a positive mechanical ghosting.
Figure 2:
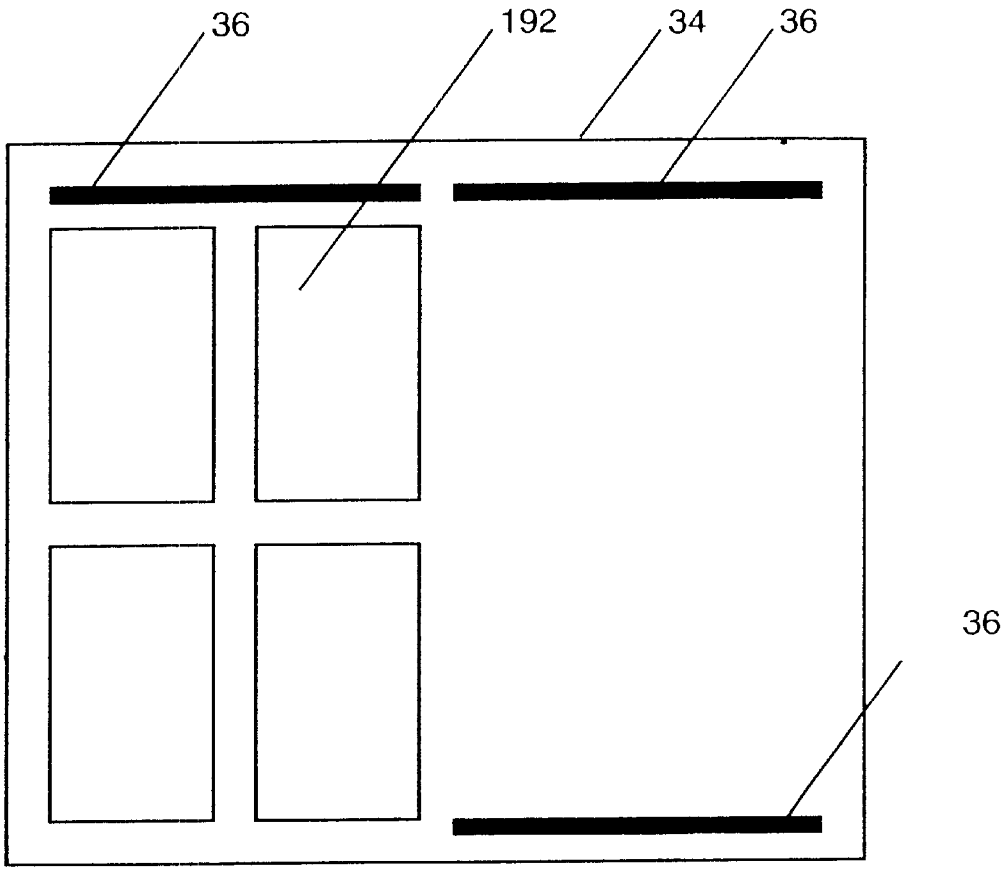
FIG.2 (Prior Art)
FIG. 2 is an illustration of a plate imposition pattern with a significant image free area and prone to water on plate trapping.
Figure 3A:
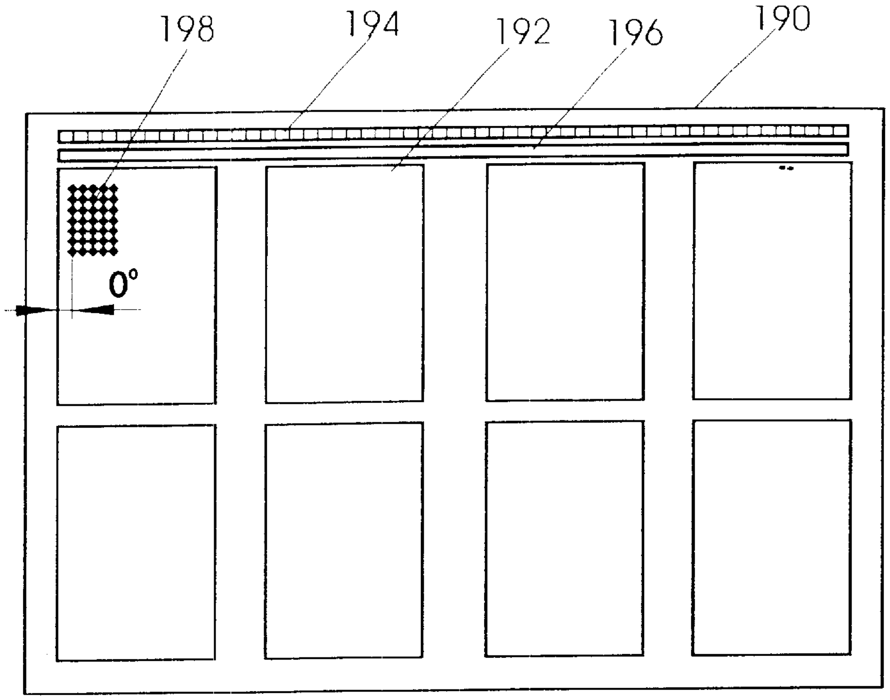
FIG. 3A (PRIOR ART)
FIG. 3A is an illustration of a plate imposition pattern prone to mechanical ghosting.
Figure 3B:
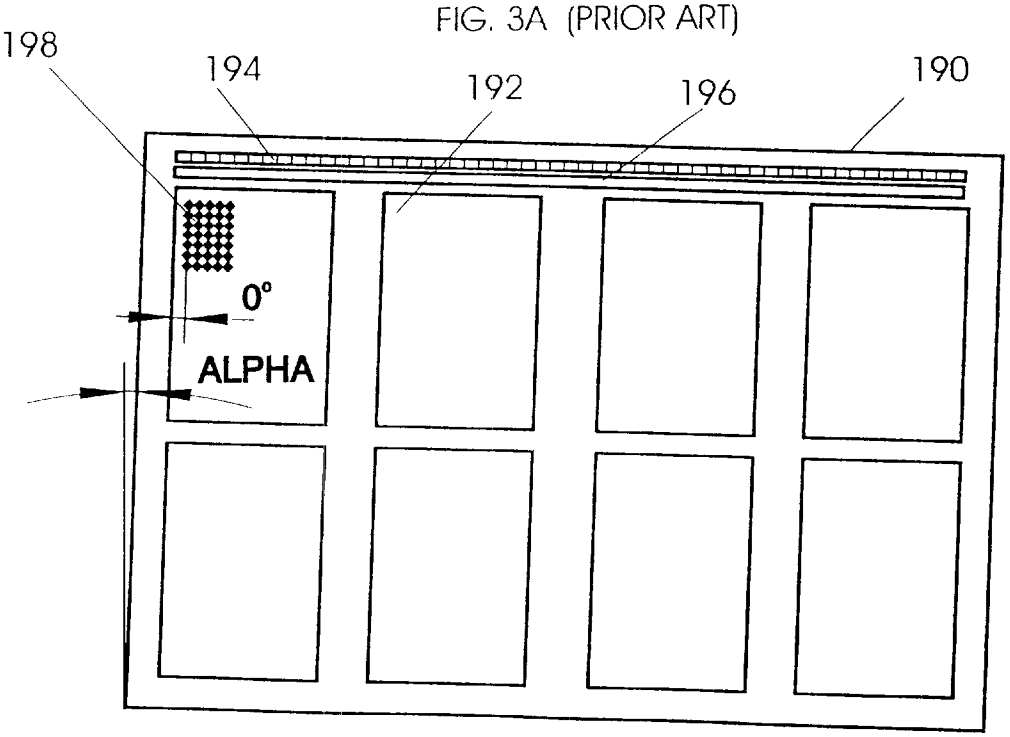
FIG. 3B (PRIOR ART)
FIG. 3B is an illustration of a prior art image of an offset plate with an imposition pattern prone to mechanical ghosting, manually angled/rotated on the press.
Figure 3C:
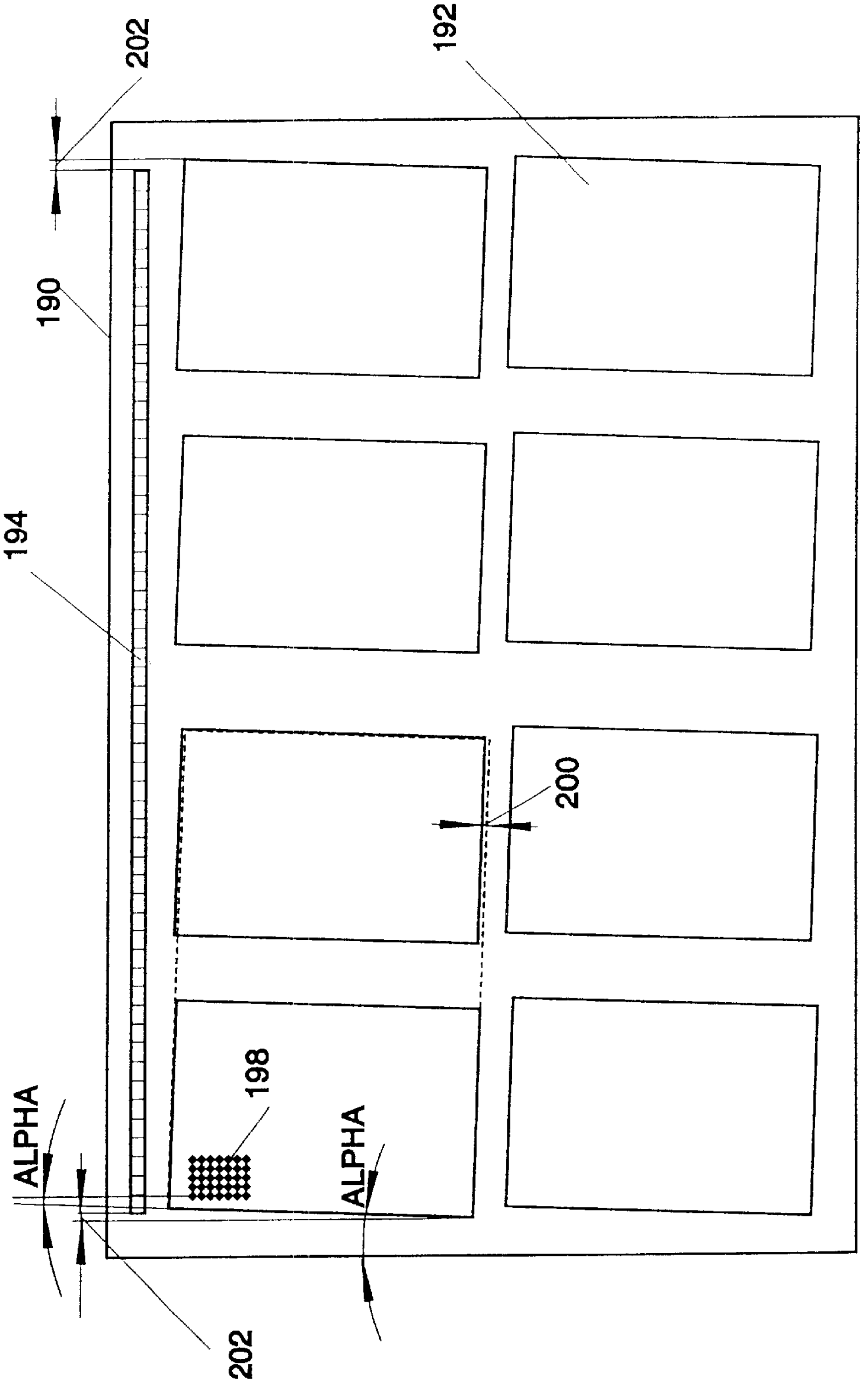
FIG. 3C (PRIOR ART)
FIG. 3C is another illustration of a prior-art image of an offset plate with an imposition pattern prone to mechanical ghosting, electronically angled.
Figure 3D:
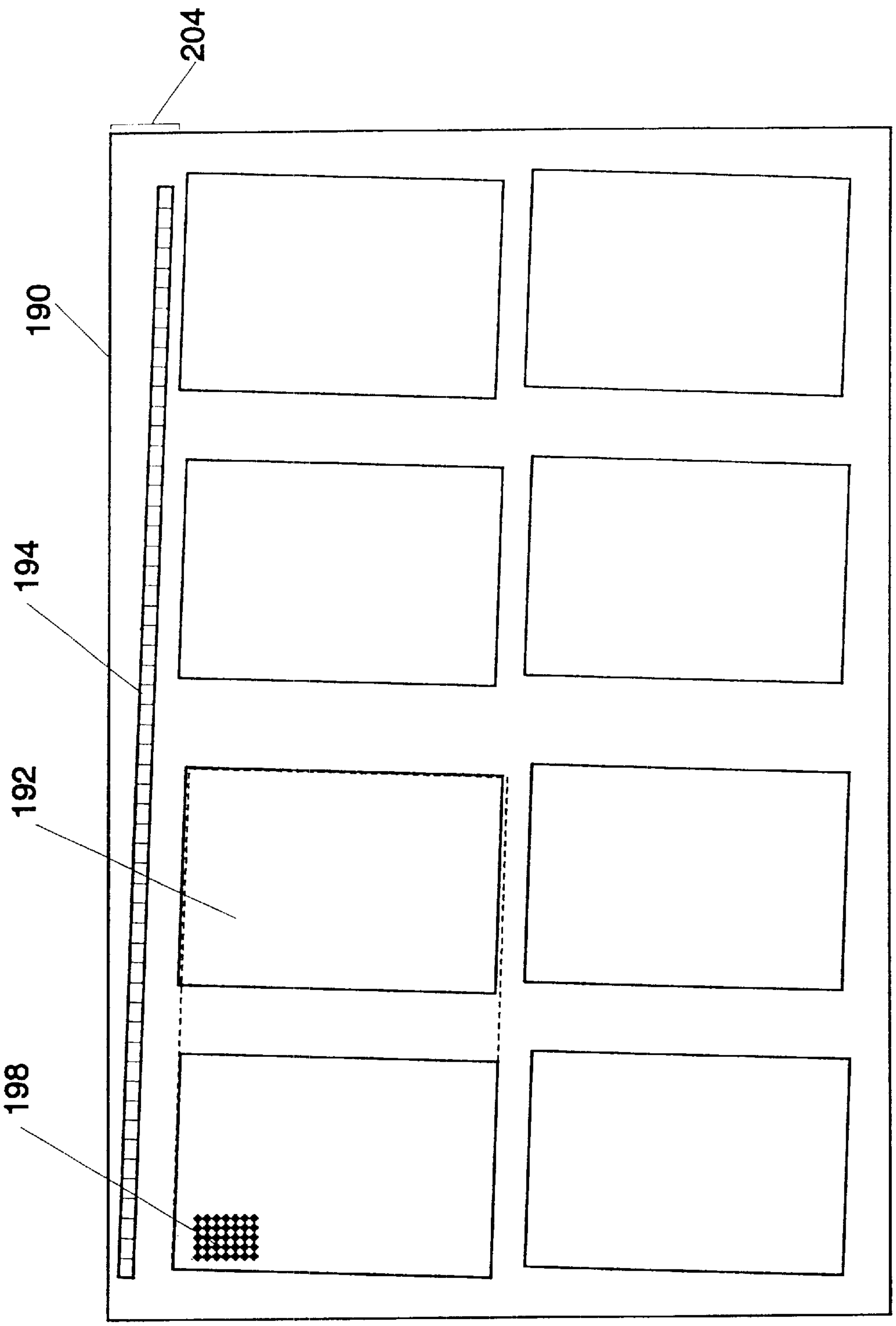
FIG. 3D (PRIOR ART)
FIG. 3D is another illustration of a prior-art image of an offset plate with an imposition pattern prone to mechanical ghosting, electronically angled.

The ghosting-corrected digital representation of the signature is further provided to water-on-plate trapping prediction and compensation unit 66. A typical imposition signature prone to water-on-plate trapping is shown in FIG. 2. Should the imposition signature be found prone to water-on-plate trapping, the water-on-plate trapping prediction and compensation unit 66 will issue instructions for automatic insertion of water take-off bars and a final signature data will be generated by the digital signature assembly generator 46.

Digital signature assembly generator 40 provides final ghosting and water-on-plate trapping compensated signature data and screen control parameters to the screen generator unit 50. Data from the screen generator unit 50 is received by the digital output device 52 and on-press digital imaging device 53, both in communication therewith, for the preparation of the plate 54 and printed sheet 70, respectively. Alternatively, the digital signature assembly generator 16 provides final ghosting and water-on-plate trapping compensated signature data to a proofing unit 59, for example improof commercially available from Scitex. Digital signature assembly generator 46 also provides the final ghosting end water on-plate trapping compensated signature data to a wet-ink trapping analysis unit 60, that corrects the zonal ink key setting for wet-Ink trapping.

The unified page data provided by color/spatial unification apparatus 44 to the digital signature assembly generator 46 preferably contains indications on presence of non-process colors, such as special spot (solid) colors or metal colors. Digital signature assembly generator 46 provides the final ghosting and water on plate trapping compensated signature data with indication on the position of the special spot colors or metal colors on the signature. The metal/solid water analysis unit 62 adds to the press set-up data information on the preferred water/solution settings for these particular signatures Preferably signature assembly generator 48 is operative to receive from apparatus 40, in at least one of digital pages 42, an operators selection of crucial zones, termed herein "areas of interest", whose appearances are to be faithfully reproduced. Preferred methods and apparatus for preserving the appearance of a color image are described in U.S. Pat. No. 5,296,935 Alternatively, the areas of interest may represent spot (solid) or metal colors.

Signature assembly generator 48 identifies the information regarding the areas of interest by signature coordinates and provides these coordinates to press control device 49 and to the metal/solid-color water analysis unit 62 (via digital signature assembly generator 46). The metal/solid-color water analysis unit 62 adds to the press set-up data information on the preferred water/solution settings for these particular signatures. Preferably, the above information regarding areas of interest is included in the file list supplied to digital signature assembly generator 46.

The digital signature assembly generator 46 is also operative to provide the press set-up data, corrected for wet ink trapping and spot/metal color control to the press set-up device 56 which is operative to set up or "make ready" the press 58 which produces a printed sheet 70. The press set-up information, derived by the digital signature assembly generator 40, is typically communicated to the press using a standard Print Production Format communication protocol called CIP3.

The method of operation of the press control device 49 preferably provide inspection of at least one location of the printed sheet 70. The location is defined by apparatus 40 and is identified by signature coordinates by signature assembly generator 48. The inspection, aimed at obtaining, in at least the defined location, an indication of the visual appearance of the image, including at least its color content, is disclosed in U.S. patent application Ser. No. 17/650,249 (now U.S. Pat. No. 5,875,288 to Bronstein et al.).

The apparatus of FIG. 5 preferably includes a database, residing in any suitable location such as the memory of apparatus 40, which stores preferred combinations of ink, paper and press parameters including press ICC color profile. The preferred combinations are preferably combinations that are known to provide faithful reproduction of color images. The database information is preferably utilized to modify the operation of color/spatial unification device 44 and/or press set-up device 56.

The printed sheet 70 provided by the press 58 is then provided to post-press equipment such as folding, cutting and binding equipment (not shown) using known techniques, thereby to provide a final printed product which may comprise a plurality of printed sheets, such as but not limited to a book, newspaper, or magazine.

Figure 6:
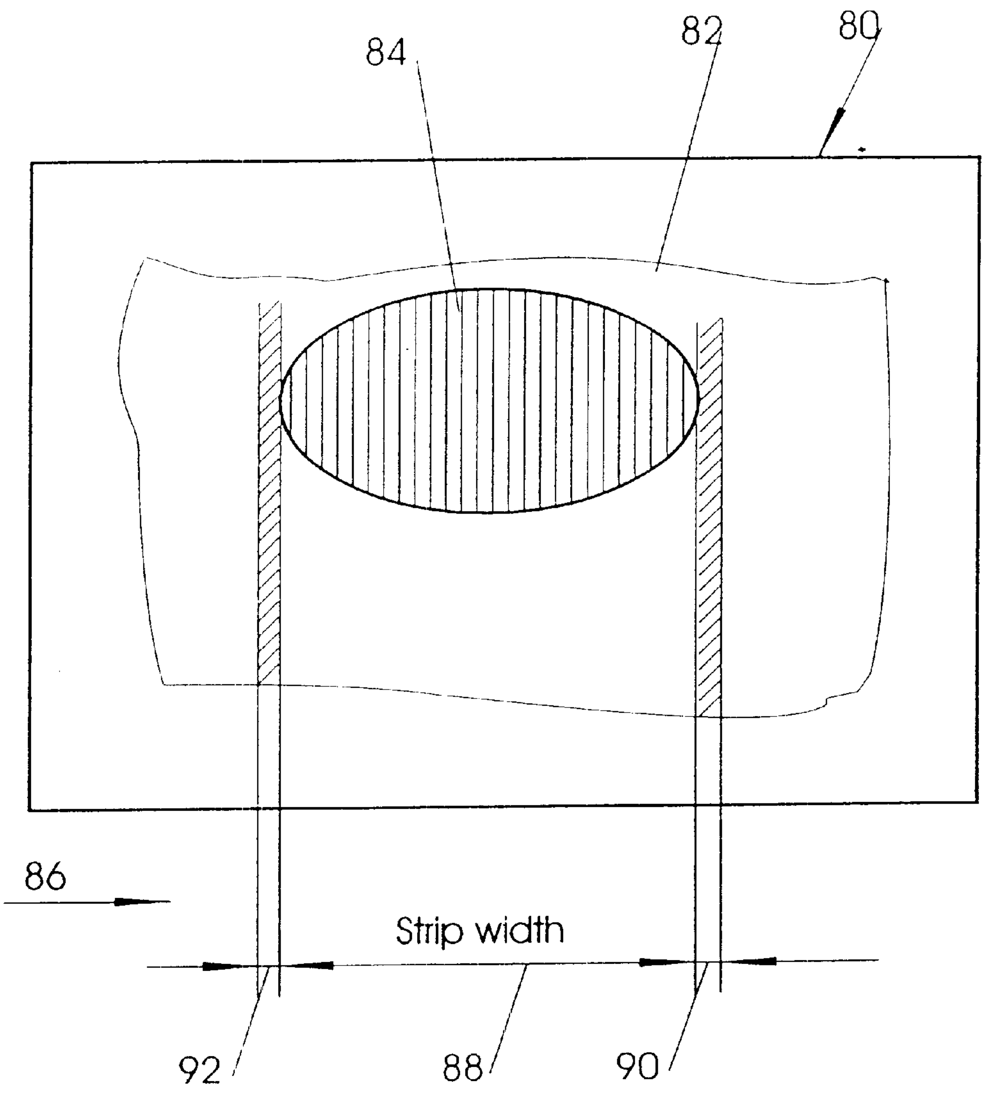
FIG. 6 is an illustration of a printing form/plate pattern containing objects prone to mechanical ghosting.

Reference is made now to FIG. 6, which is an illustration of a printing form/plate pattern containing objects prone to mechanical ghosting. The plate 60 contains an image 82, part of which is an object 84. Object 84 will cause the appearance of ghosting patterns during the printing process.

Figure 7A:
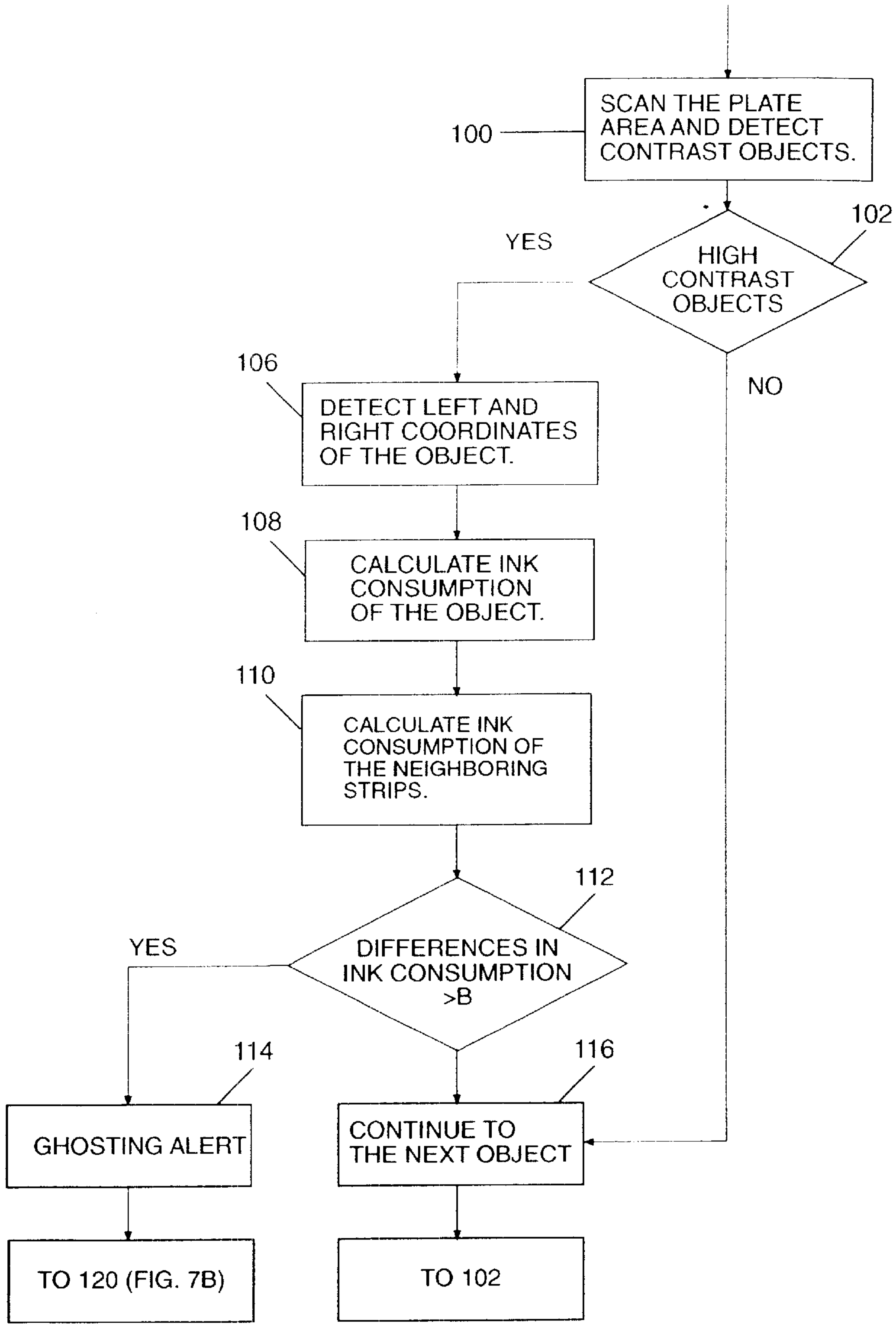
FIG. 7A is a flowchart of the system shown in FIG. 5, providing a procedure useful in conjunction with the algorithm that supports detection of objects prone to mechanical ghosting.
Figure 7B:
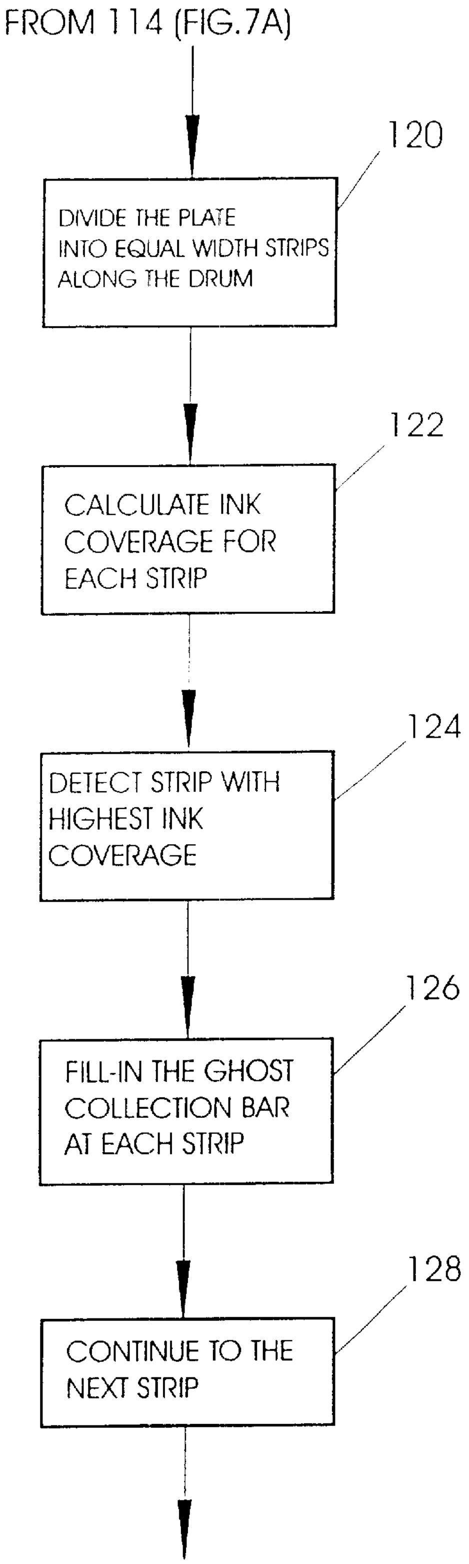
FIG. 7B is a flowchart of the system shown in FIG. 5, providing a procedure for automatic introduction of a mechanical ghosting prevention pattern on a printing form/plate with objects prone to mechanical ghosting.

Reference is also made to FIGS. 7A and 7B, which are illustrations of a method for detection end prevention of mechanical ghosting.

FIG. 7A presents in detail the operation of the mechanical ghosting prediction and compensation unit 64 of the system of FIG. 6. It provides a procedure useful in conjunction with the algorithm that supports detection of objects prone to mechanical ghosting and is useful in implementing an integrated computerized system for use in printing, constructed and operative in accordance with a preferred embodiment of the present invention. Since mechanical ghosting is a single separation phenomenon, it is typically characterized by the high contrast of the ghosting-prone object to its neighborhood in practice, this means that the area along the press drum, which is defined by the leftmost and rightmost coordinates of the object, consumes a different amount of ink as compared to its neighborhood.

The examination of the contrast gradient is performed when scanning the image to be printed across the plate cylinder e.g. from left to right, as indicated by arrow 88 in FIG. 6. As mentioned above, mechanical ghosting is a single separation phenomenon and in order to detect it, each separation should be examined separately. Separation examination is performed at any image resolution. Separation examination at low plate image resolution, similar to display resolution, is preferred since it reduces image-processing time.

Figure 8A:
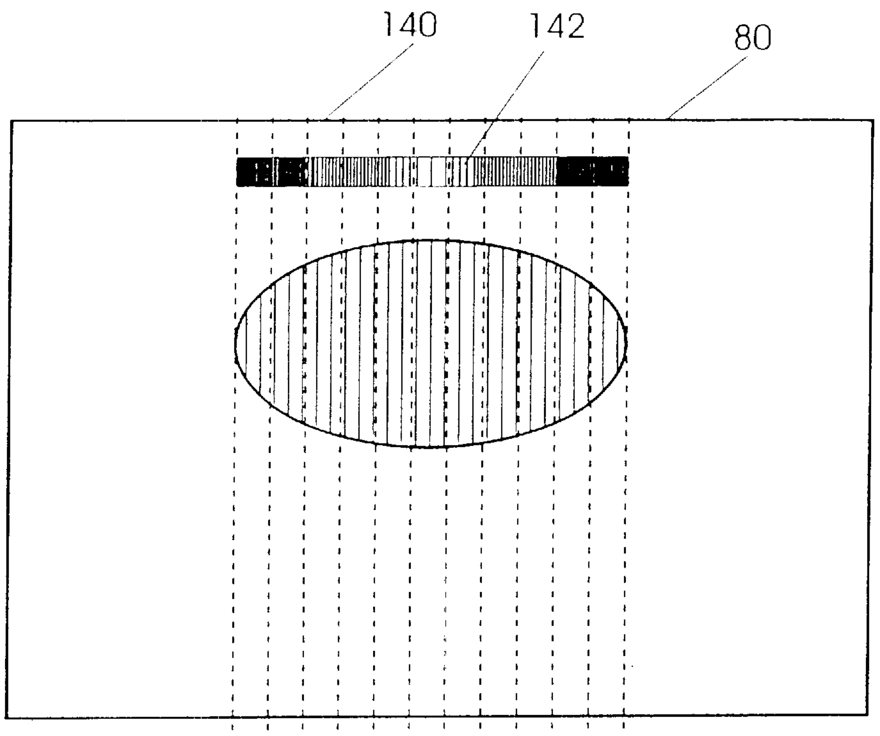
FIG. 8A is an illustration of the printing form/plate of FIG. 6, with automatically introduced mechanical-ghosting prevention patterns/bars, in accordance with a preferred embodiment of the present invention.

In step 100 of FIG. 7A, the plate image/data produced by the digital signature assembly generator 46 is examined/ scanned in the direction indicated by arrow 66. The detected contrast objects/areas (e.g. transitions from shadow to highlight or from highlight to shadow) with respect to their neighborhood are analyzed at step 102 far the value of the contrast. The immediately neighboring (to the object) transition areas arc indicated by numerals 90 and 92 on FIG. 6. If the area analyzed at step 102 does not include high contrast transitions, the program proceeds scanning for the next object at step 116. If the transition exceeds a certain predetermined value A, which is typically dependent on the construction of the particular press, the program marks the plate image as prone to mechanical ghosting and proceeds to detect, at step 106, the coordinates of the left and right boundaries of the area. When the coordinates of the left and right boundaries or the object 84 have been detected at step 106 and the width of strip 88 occupied by the object is known, the program calculates at step 108 the ink consumption of strip 88. At step 110, ink consumption of the neighboring strips 90 and 92 is calculated. The ink consumption data of the neighboring strips is compared with the target object ink consumption and if the difference tested at step 112, exceeds a certain value B which is typically dependent on the construction of the particular press, the printing form/plate is determined to be prone to mechanical ghosting The program issues a ghosting alert at step 114, which is a warning to the prepress/press operator and proceeds to step 120 in FIG. 7B, where the values of the ghost prevention ink collection bars and their positions are automatically defined. If the difference in ink consumption between the neighboring areas and the target object ink does not exceed the target value B, the program continues to detect the next object at 116, until all objects on the plate have been detected. Stops 120–128 provide a procedure for automatic introduction of a mechanical-ghosting prevention pattern on a print form/plate with objects prone to mechanical ghosting. Reference is also made to FIG. 8A, which is an illustration of the printing form/plate of FIG. 6, with automatically introduced mechanical ghosting prevention pattern/bars. In step 120, the program divides the signature/plate into equal strips 140, as shown in FIG. 8A, along the circumference of the plate cylinder. The widths of the strips may be chosen arbitrary and need nut necessarily be equal to the width of the ink key zones of a particular press. The strips include an area of a ghosting prevention bar 142. In step 122, the program calculates ink coverage for each strip and following this, the strip with highest ink coverage is detected in step 124. The ghosting prevention bar 142 content and position are now calculated in step 126. The ghosting prevention bar 142 content is typically calculated at the best possible ink coverage, namely, the ink content of the ghosting prevention bar at any given strip equals the difference between the ink coverage of that strip and the highest ink coverage among all strips. The program continues in step 128, until all strips are filled-in with ghosting prevention bars. The corrected imposition data is returned to digital signature assembly generator 48 in FIG. 5, where the ink coverage data required for press setting is generated. The corrected imposition is also passed on to water trapping prediction and compensation unit 66.

The distribution of density in bar 142 in FIG. 8A schematically illustrates the operation of the above described ghosting detection and automatic compensation pattern insertion algorithm.

Figure 8B:
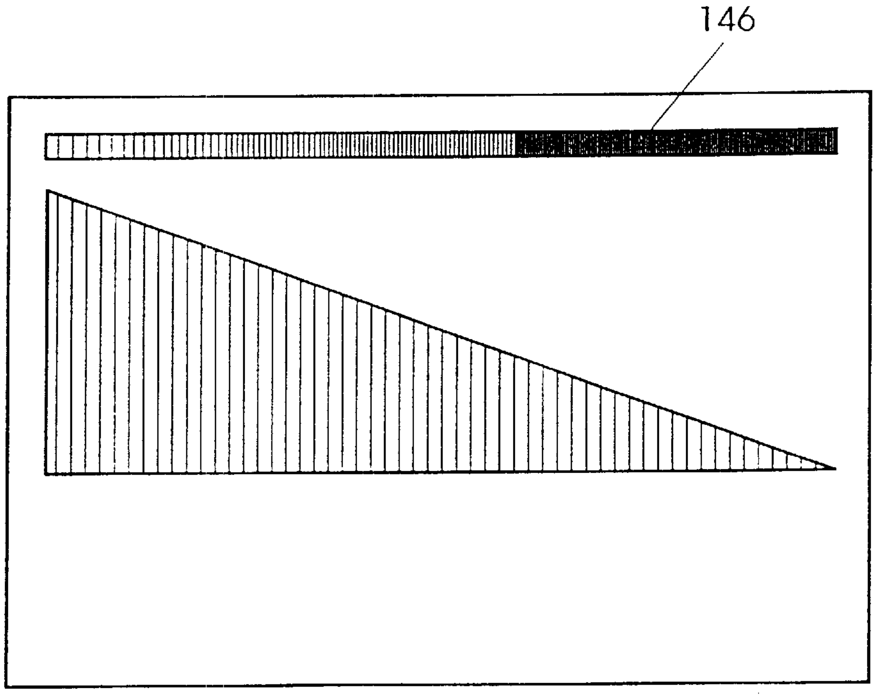
FIG. 8B is another illustration of a printing form/plate prone to ghosting, with automatically introduced mechanical-ghosting prevention patterns/bars, in accordance with a preferred embodiment of the present invention.

FIG. 8B is an illustration of another printing form/plate prone to ghosting, with automatically introduced mechanical ghosting prevention pattern/bars 146.

Figure 9:
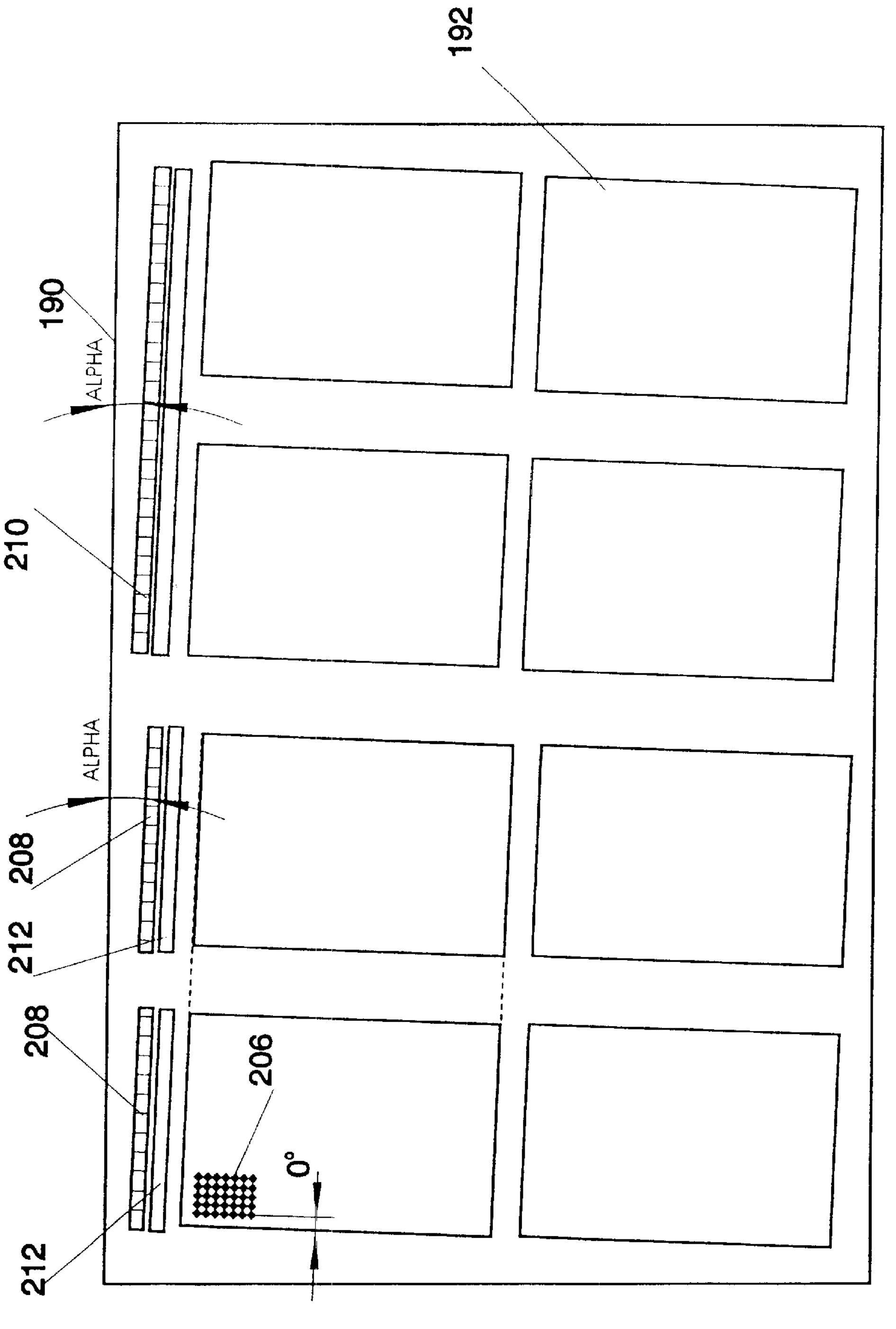
FIG. 9 is an illustration of an image of an offset plate with on imposition pattern prone to mechanical ghosting, electronically angled according to a preferred embodiment of the present invention.

FIG. 9 is an illustration of an electronically angled image of an offset plate 190 with an imposition pattern prone to mechanical ghosting, according to a preferred embodiment of the current invention. According to this embodiment, should the system detect a need to angle the plate/image, the angling process will be accompanied by the whole screen quartet (CMYK) rotation in the same angle Alpha and in the same direction. The screen structure 206 and the 0-degree angle created by the yellow separation are shown in an exaggerated form on FIG. 9. The screen quartet rotation prevents the appearance of undesired staircase visual effects, by maintaining the 0 or 90 degrees orientation of the screens with respect to the image.

The pages 192 are rotated in printer spread pairs (shown in dotted line), maintaining their respective orientation and common bottom/top edge alignment. The control strip is divided into separated segments 208 and 210, each associated with either one particular page or a printer spread and these segments are angled and positioned where desired. Segmentation and subsequent segments rotation, maintains the control strips' respective orientation and position with respect to separate pages and printers spreads and leaves enough space for the insertion of ghosting prevention bars 212. The position of the control strips and ghosting prevention bars may not match the one shown in FIG. 9. The program may place them in any free space on the plate, provided it meets the ghosting prevention criteria set above. This flexibility in positioning the bars may lead to additional paper savings.

As indicated earlier, FIG. 2 is an illustration of a plate imposition pattern with a significant image free area and prone to water-on-plate trapping.

Figure 10:
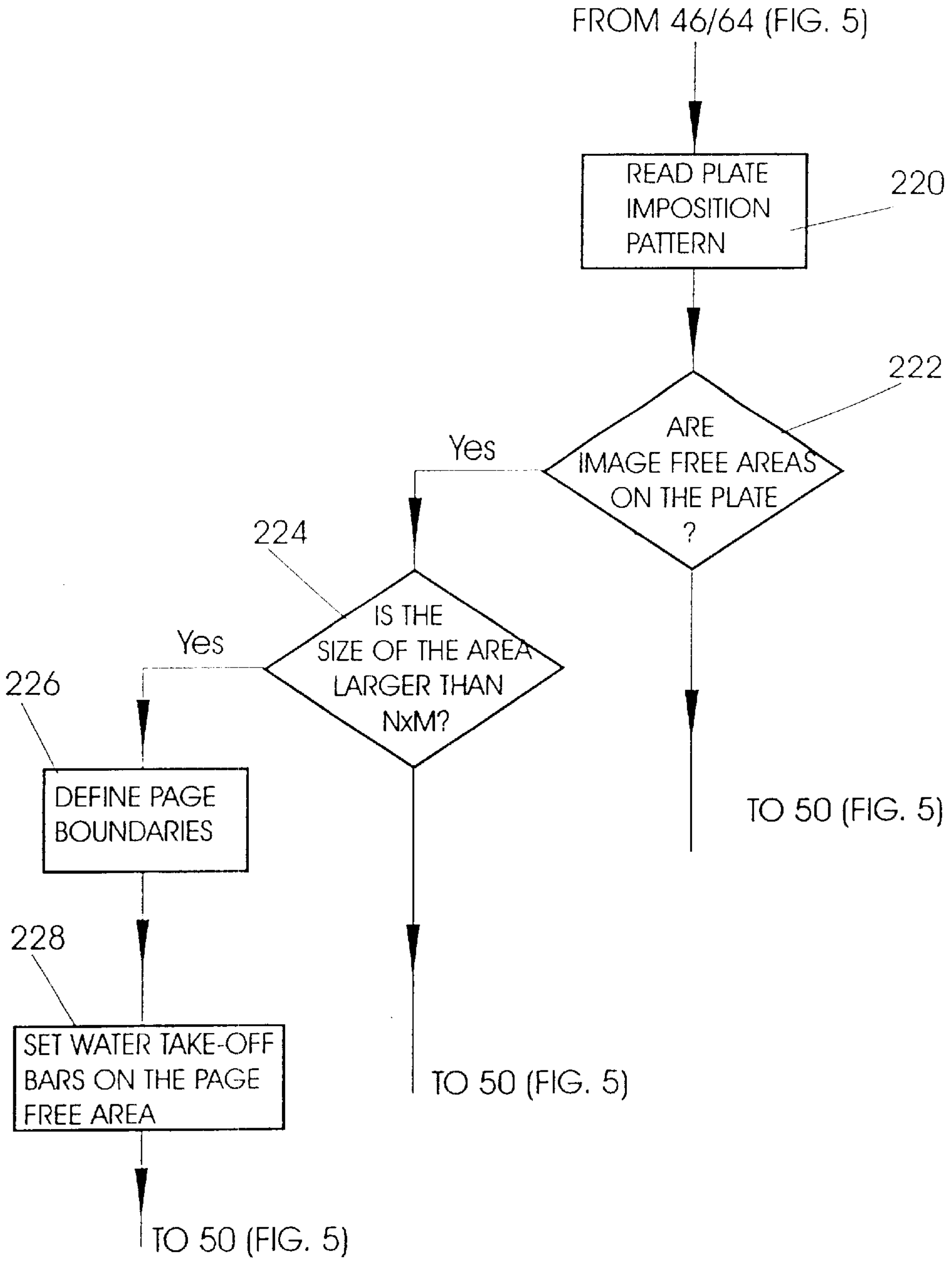
FIG. 10 presents in detail the operation of the water trapping prediction and compensation unit of the system of FIG. 5, providing a procedure useful in conjunction with the algorithm that supports automatic insertion of water take-off bars on a plate imposition pattern prone to water on plate trapping.
Figure 11:
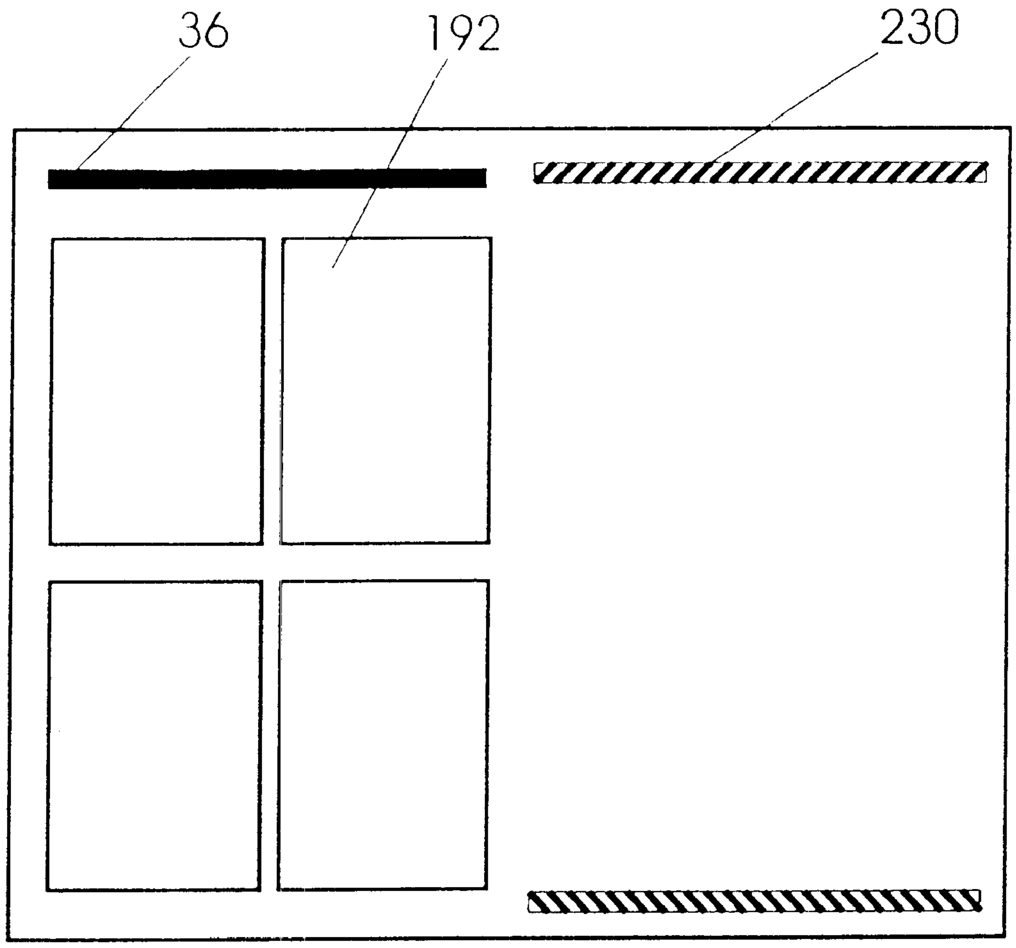
FIG. 11 is an illustration of a plate imposition pattern prone to water on plate trapping with automatically inserted water take off bars.

FIG. 10 presents in detail the operation of water trapping prediction and compensation unit 66 of the system of FIG. 6, providing a procedure useful in conjunction with the algorithm that supports automatic insertion of ink take-off bars on a plate imposition pattern prone to water-on-plate trapping. In step 220, the imposition pattern is received from the digital signature assembly generator 46 or the mechanical ghosting prediction and compensation unit 64 of FIG. 5 and analyzed for presence of image-free areas in step 222. If no image-free areas have been detected, the program proceeds to the screen generator unit 50 of FIG. 5. The areas may not necessary be image free. The plate may have significant areas filled with text only. Typical ink coverage of text areas does not exceed five or six percent. Should image free areas (or text areas only) on the plate be detected and their size, as indicated in step 224, exceed certain dimensions of, for example, M×N square millimeters, the program proceeds to step 226 and analyzes the page/plate boundaries. It is necessary to indicate that the dimensions M×N square millimeters of the image free area is a variable depending on press characteristics, paper surface and ink used and would typically be established empirically and stored in a database that may reside in any suitable location, such as the memory of signature assembly generator 48, or in a more general server based database. If the dimensions of the image free areas are smaller than M×N square millimeters, the program proceeds to the screen generator unit 50 of FIG. 5. Otherwise, the program proceeds, in step 228, to insert water take-off bars on the image-free areas, or in predefined places on the plate 54 and continues to steps performed by the screen generator 50 (FIG. 5). Solid ink take-off bars would, however, make this area prone to water-on-plate trapping. In order to avoid water-on-plate trapping, the solid ink take-off bars are automatically generated as segments of a solid bar, inclined 45 degrees or any other angle to the direction of the print form movement The pattern composing the lead edge ink take-off bar preferably has an angle of 90 degrees relative to the pattern of the trailing edge ink take-off bar, as shown in FIG. 11. This automatically generated mutual orientation of the ink take-off bars and their form prevents water-on-plate trapping.

FIG. 11 is an illustration of a plate imposition pattern prone to water-on-plate trapping, with water take-off bars 230 automatically inserted according to the algorithm described above.

Existing ink key setting algorithms perform the ink key setting, primarily based on the percentage of the surface coverage by particular ink and do not necessary account for wet-ink trapping. In practice and especially at, higher dot percentage values, there is a significant overlap between the screen cells within a so-called screen rosette. Thus, the actual ink setting values may be different and affected by the order of the colors, printing. This means that the ink values may be different if the color printing order is KCMY or YCMK. The wet-ink trapping analysis unit 60 of FIG. 5 receives the first printing color from digital signature assembly generator 46 and calculates the first printing ink key setting. The first printing color ink key setting instructions are issued to the press device 56 of FIG. 5. The program proceeds according to the method described in the article "Why the offset lithographic process must be changed to meet print-on-demand requirements with respect to color control" by Erik Nikkanen (published by Fountech Inc., Canada), and incorporated herein by reference, and calculates the screen overlap values for the second color and generates, according to the values of the second color the ink keys settings. The program proceeds in a similar way for the remaining colors.

Figure 12:
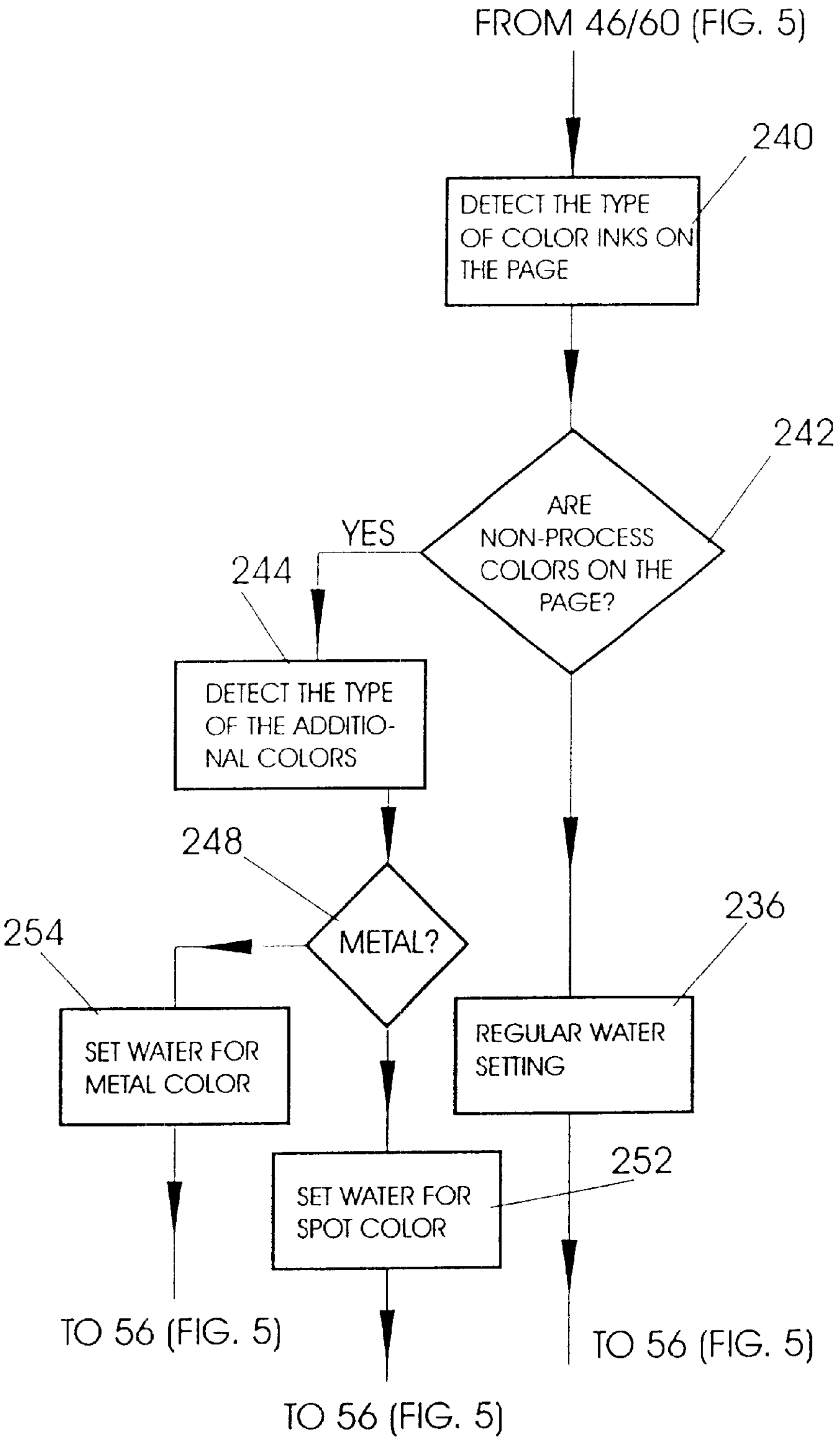
FIG. 12 presents in detail step(s) performed by the metal/solid color water analysis unit of the .system of FIG. 5, providing an improved algorithm useful for implementing digital signature assembly and calculating water or solution setting data, when metal and/or spot colors are present on the plate.

FIG. 12 presents in detail step(s) performed by the metal/solid color water analysis unit 62 (FIG. 5). It provides an improved algorithm useful in implementing digital signature assembly and calculating water or solution setting data, when metal and/or spot colors are present on the plate. Here, the imposition pattern and the color content data are received from the digital signature assembly generator 46 or the wet-ink trapping analysis unit 60 of FIG. 5 and analyzed, in step 240, for presence of more than four color-inks in the same image. Should the program detect, in step 242, that more than four color inks (typically process color inks) are present in an image, it will proceed to step 244, where the type of the inks in terms of metal or spot color will be defined. If no metal of spot colors are present in the image the program will issue regular ink setting values in step 236 and will generate data for the press set-up device 56 of FIG. 5. If metal or spot colors are detected, the program further analyzes the image at step 248, to identify if the color is metal or spot. If the additional color detected is not a metal color, the program issues spot color ink setting values in step 252 and generates data for the press set-up device 56 of FIG. 5. If the color detected is a metal one, the program issues metal ink sifting values in step 254 and generates data for the press set-up device 56 of FIG. 5.

In the present specification, the term "page" is intended to include any unit included within a signature, which may include representations of an actual page, such as a page of a book, as well as representations of signature markings and control strips. The term "plate" is intended to refer to any unit of production of a printing device such as a press, including, but not limited to, a print form only.

The methods and apparatus disclosed herein have been described without reference to specific hardware of software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

It will further be appreciated by persons skilled in the art that the methods described above may be implemented by software or software means (data) executable on computing means, such as a CPU, PC, or other similar data processors, microprocessor, embedded processors, microcomputers, microcontrollers, etc. The computing means processes the inputted data from apparatus in communication therewith to calculate a desired result. Processing includes performing operations preferably in the form of algorithms (as detailed) for performing the detailed methods of the present invention.

It will be appreciated by persons skilled in the art that the present invention 13 not limited by what has been particularly shown and described herein above, rather the scope of the invention is defined by the claims that follow.

What is claimed is:

1. A computerized prepress and press system, said system comprising:

imposition means for receiving from a digital storage means at least one digital representation of at least one page and for arranging said at least one digital representation in accordance with a desired plate layout, thereby to define a digital plate image; and ghosting prediction means coupled to said imposition means, operable to make a ghosting prediction based on data from at least one said digital plate image and a relatively low resolution version of said data, where ghosting will occur.

2. A system according to claim 1, additionally comprising:

ghosting prevention means coupled to said ghosting prediction means and to said imposition means, operable to calculate positions and color values for ghosting prevention bars, using cold ghosting prediction.

3. A system according to claim 2, additionally comprising means for automatically inserting said ghosting prevention bars into said digital plate image.

4. A system according to claim 1, additionally comprising:

water trapping prediction means coupled to said ghosting prediction means and to said imposition means, operable to predict, based on said data, where water trapping will occur on a plate.

5. A system according to claim 4, additionally comprising;

water trapping compensation means, coupled to said water trapping prediction means, operable to calculate positions and sizes for water-trapping prevention bars, using said water trapping prediction.

6. A system according to claim 1, additionally comprising:

wet ink trap correction means coupled to said imposition means, operable to produce a corrected zonal ink key setting for wet ink trapping.

7. A system according to claim 6, additionally comprising:

means for transferring said corrected zonal ink key setting to a press set-up means of said press.

8. A system according to claim 1, additionally comprising:

means for calculating automatic water setting.

9. A system according to claim 8, wherein said means for calculating automatic water setting comprise means for calculating automatic water setting for spot colors.

10. A system according to claim 8, wherein said means for calculating automatic water setting comprise means for calculating automatic water setting for metal colors.

11. A system according to claim 8, additionally comprising:

means for transferring said automatic water setting to a press set-up means of said press.

12. A method for creating a digital image of a printing plate, comprising the steps of:

creating a first digital image of said printing plate, using digital representation of at least one page and given coordinates thereof on said printing plate;

using said first digital image of said printing plate to predict where ghosting will occur on said printed image;

using said first digital image of said printing plate and said prediction to create a second digital image of said printing plate, comprising ghosting prevention bar.

13. The method of claim 12, wherein said ghosting prevention comprises inserting ghosting prevention bar into said first digital image.

14. The method of claim 13, wherein said ghosting prevention bar is divided into segments.

15. The method of claim 12, wherein said ghosting prevention comprises rotating said at least one page of said first digital image and rotating the screen pattern of said at least one page by the same rotation angle.

16. The method of claim 12, wherein said ghosting prevention comprises rotating at least one primer-spread of said first digital image and rotating the screen pattern of said at least one printer-spread by the same rotation angle.

17. The method of claim 12 additionally comprising the step of:

dividing the color control bar of said digital image into segments.

18. The method of claim 12, additionally comprising the steps of:

using a digital image of said printing plate to predict where water trapping will occur on said printing plate; and using said digital image of said printing plate and said prediction of water trapping to create a new digital image of said printing plate, comprising digital water take-off bars.

19. The method of claim 12, wherein said step of using said first digital image to predict where ghosting will occur on said printed image additionally comprises using a relatively low resolution version of said first digital image.

* * * * *

UNITED STATES PATENT AND TRADEMARK OFFICE

CERTIFICATE OF CORRECTION

PATENT NO. : 6,441,914 B1
DATED : August 27, 2002
INVENTOR(S) : Barak, Paltiel et al.

It is certified that error appears in the above-identified patent and that said Letters Patent is hereby corrected as shown below:

Column 1,
Line 67, please replace “Dolov” with -- Dolev --.

Column 2,
Line 10, please replace “ease” with -- case --.
Line 14, please replace “mounting ink” with -- mounting, ink --.
Line 31, please replace “pen” with -- per --.
Line 55, please replace “he” with -- be --.

Column 3,
Line 4, please replace “end” with -- and --.
Line 21, please replace “26. 250-300” with -- 26, 250-300 --.
Line 41, please replace “and, frequency” with -- and frequency --.
Line 44, please replace “solution” with -- solutions --.
Line 57, please replace “tree” with -- free --.

Column 4,
Line 22, please replace “un” with -- on --.
Line 39, please replace “/5” with -- 75 --.

Column 6,
Line 9, please replace “acting” with -- setting --.
Line 22, please replace “stop” with -- step --.

Column 7,
Line 43, please replace “on” with -- an --.
Line 57, please replace “.system” with -- system --.

Column 8,
Line 41, please replace “40” with -- 46 --.
Line 43, please replace “Is” with -- is --.
Line 44, please replace “at tiles” with -- of files --.

UNITED STATES PATENT AND TRADEMARK OFFICE

CERTIFICATE OF CORRECTION

PATENT NO. : 6,441,914 B1
DATED : August 27, 2002
INVENTOR(S) : Barak, Paltiel et al.

It is certified that error appears in the above-identified patent and that said Letters Patent is hereby corrected as shown below:

Column 9,
Line 23, please replace “40” with -- 46 --.
Line 30, please replace “16” with -- 46 --.
Line 33, please replace “improof” with -- Improof --
Line 35, please replace “end” with -- and --.
Line 37, please replace “Ink” with -- ink --.

Column 10,
Line 7, please replace “40” with -- 46 --.
Line 35, please replace “60” with -- 80 --.
Line 39, please replace “end” with -- and --.
Line 44, please replace “6” with -- 5 --.
Line 52, please replace “neighborhood in” with -- neighborhood. In --.
Line 58, please replace “88” with -- 86 --.

Column 11,
Line 1, please replace “66.” with -- 86. --.
Line 4, please replace “far” with -- for --.
Line 6, please replace “arc” with -- are --.
Line 24, please replace “ghosting The” with -- ghosting. The --.
Line 32, please replace “Stops” with -- Steps --.
Line 41, please replace “nut” with -- not --.
Line 55, please replace “48” with -- 46 --.

Column 12,
Line 33, please replace “6” with -- 5 --.

Column 13,
Line 12, please replace “at, higher” with -- at higher --.
Line 16, please replace “colors, printing” with -- colors printing --.
Line 22, please replace “press device” with -- press set-up device --.

UNITED STATES PATENT AND TRADEMARK OFFICE

CERTIFICATE OF CORRECTION

PATENT NO. : 6,441,914 B1
DATED : August 27, 2002
INVENTOR(S) : Barak, Paltiel et al.

It is certified that error appears in the above-identified patent and that said Letters Patent is hereby corrected as shown below:

Column 14,
Line 17, please replace "13" with -- is --.
Line 38, please replace "cold" with -- said --.

Column 15,
Line 12, please replace "image;" with -- image; and --.

Column 16,
Line 2, please replace "primer" with -- printer --.

Signed and Sealed this

Twenty-ninth Day of April, 2003

JAMES E. ROGAN
*Director of the United States Patent and Trademark Office*